United States Patent
Deskevich

Patent Number: 5,077,928
Date of Patent: Jan. 7, 1992

[54] FISHING LINE ROD BOBBER

[76] Inventor: John Deskevich, 385 Sterling Ave., Nanty Glo, Pa. 15943

[21] Appl. No.: 597,179

[22] Filed: Oct. 15, 1990

[51] Int. Cl.$^5$ .............................. A01K 93/00
[52] U.S. Cl. ........................................ 43/17
[58] Field of Search .................... 43/17, 16, 17.1, 17.5

[56] References Cited

U.S. PATENT DOCUMENTS

| | | | |
|---|---|---|---|
| 2,137,341 | 11/1938 | Hingle | 43/17 |
| 2,500,078 | 3/1950 | Ingram | 43/17 |
| 3,023,532 | 3/1962 | Gorenty | 43/17 |
| 4,552,318 | 11/1985 | Durham | 43/17 |
| 4,702,031 | 10/1987 | Sousa | 43/17 |
| 4,759,963 | 7/1988 | Uso, Jr. et al. | 43/25 |
| 4,831,772 | 5/1989 | Gillespie | 43/54.1 |

Primary Examiner—Richard K. Seidel
Assistant Examiner—Chuck Y. Mah
Attorney, Agent, or Firm—Jon M. Lewis

[57] ABSTRACT

Disclosed herein is a visible line movement indicator to indicate when a fish is on a fishing line. The indicator comprises a body of material having a perforation formed therein of sufficient dimension to allow a fishing line to slide freely therethrough. Connection means are furnished on the body for a hand removable connection to a fishing pole which comprises a Velcro type material. The invention further contemplates a fishing pole and fish-on-line indicator in combination which comprises a fishing pole having a reel near one end and at least two fishing eyelets located toward the other end. The fishing pole and on-line fish indicator have a removable connection between the fishing pole and the on-line indicator with the element on the pole located between the eyelets. The connection between the fishing pole and fish-on-line indicator comprises a Velcro type material on the pole and on the body of material. The invention further contemplates the method of fishing that comprises the steps of taking the indicator and mounting it on the pole with the body of material between two eyelets forward of the reel on the pole and having the fishing line extend through the perforation. The indicator is then removeably connected to the fishing pole and the fishing line is cast to the desired location. After casting the fishing pole is set at a rest position and the body or indicator removed from its connection with the fishing pole so as to hang freely with only the fishing line supporting it. The indicator may then be watched for movement.

15 Claims, 2 Drawing Sheets

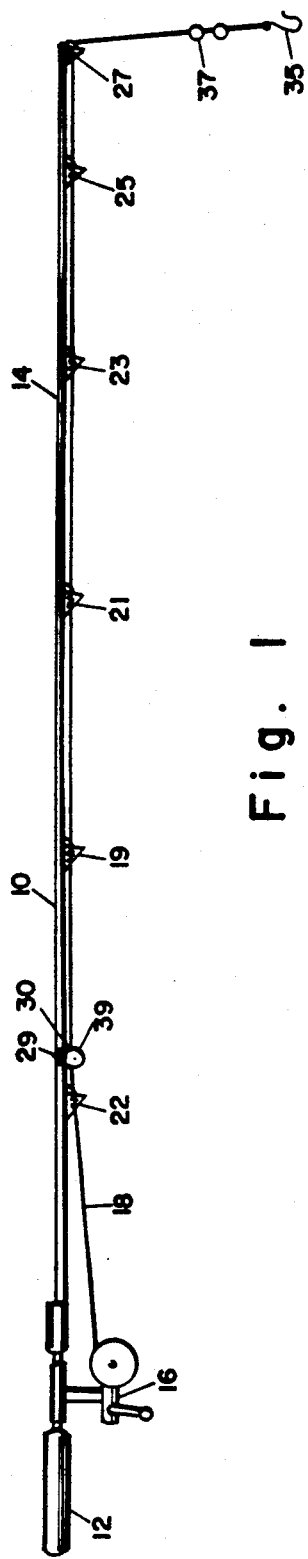
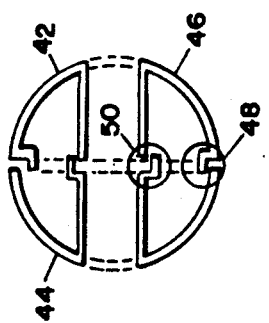
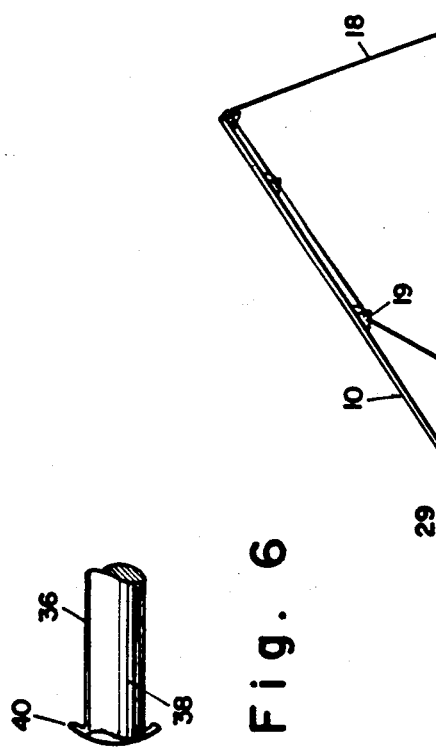
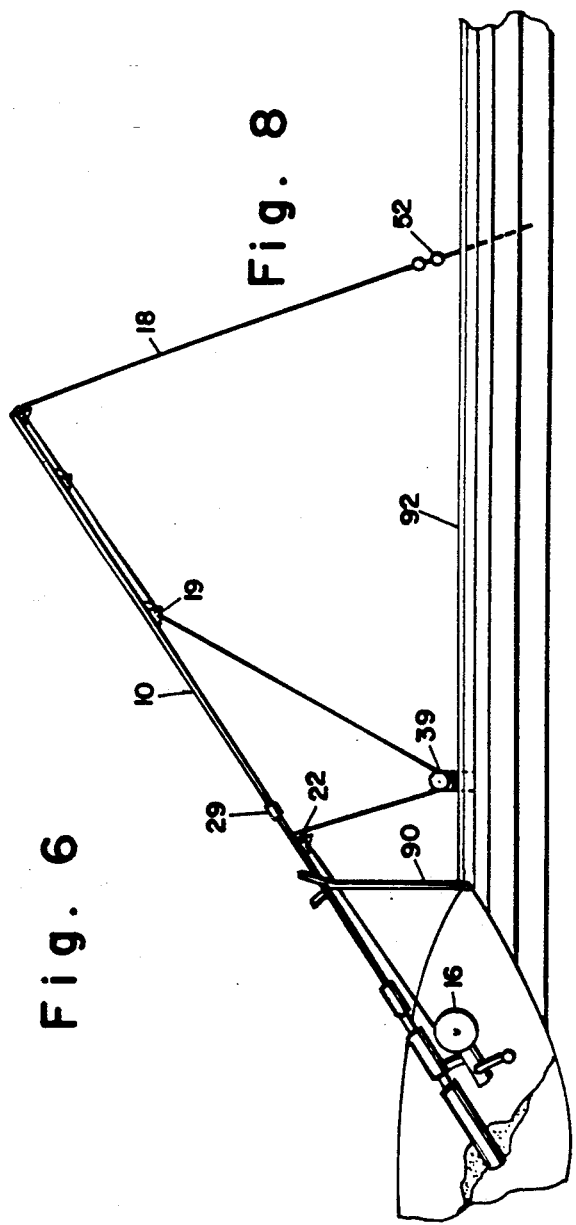
Fig. 1
Fig. 7
Fig. 6
Fig. 8

FISHING LINE ROD BOBBER

BACKGROUND OF THE INVENTION

This invention has to do with fishing equipment and is particularly concerned with a visible means of indicating to a fisherman when a fish may be pulling on the hook or bait attached to the fishing line.

A common practice among many fishermen is to cast their line to a desired spot and then place the fishing pole in a resting position until a fish takes the hook or starts to bite on the bait. Because of the thinness of the line and/or, the lack of lighting conditions present during fishing, movement of the line is difficult to discern unless the fishing pole starts to bend and shake violently. In addition there are currents and waves acting through the water that can cause the line to move, making one believe that a fish may be on the line.

Devices have been used by fishermen to provide a visible indication that a fish is on the line, with the most notable example being the typical floating fishing line bobber. The typical prior art fishing line bobber is a device that is releasably attached to the fishing line at a predetermined distance from the hook and sinker, depending on the depth one would like to have the hook in the water. Once the prior art bobber is attached to the line at the desired location, it is then necessary to cast the line with the hook, sinker and bobber, after which the pole may be placed in a position of rest. The fisherman then keeps his eye on the floating bobber in the water to see if it begins any erratic movement that he believes may not be associated with the accompanying motion of the surrounding water.

BRIEF SUMMARY OF THE INVENTION

According to the present invention there is disclosed a visible line movement indicator to indicate when a fish is pulling on a fishing line. The indicator is comprised of a body of material having a perforation, with the size of the perforation being of sufficient dimension to allow a fishing line to slide freely through the perforation. The body of material will have means for a hand removable connection to a fishing pole which will preferably comprise a VELCRO (a hook like type of fabric or material), type material on both the fishing pole and the body of material. The body of material will preferably have at least one planar section (may be flat or V-shape when viewed from the side) upon which the VELCRO (a hook like type of fabric or material), type material will be mounted. The body of material may, but does not necessarily, have a specific gravity of less than one.

The rod bobber according to the present invention will most preferably be made from a solid or hollow body of plastic material having a perforation therethrough to allow the fishing line to slide freely and will have a flat or planar section for attachment of a VELCRO (a hook like type of fabric or material), type of material. The body of material may also be chosen from the materials of wood, cork, or styrofoam, but when chosen from such a material it is preferable to form the perforation from a tubular means comprised of a material that is either plastic, ceramic, or metallic in nature.

The body of material for the rod bobber according to the present invention may also be formed of at least two mating parts with the mating parts assembled and held together to form the body.

According to the present invention there is further contemplated a fishing pole and fish-on-line indicator, in combination, which comprises a fishing pole having a reel near one end and at least two fishing eyelets located toward the other end. Attached to the pole is an on-line fish indicator comprising a body of material having a perforation of sufficient dimension to allow a fishing line to slide freely therethrough. Co-operating elements of hand removable connection are provided between the fishing pole and the on-line indicator with the element on the pole located between the eyelets.

According to the present invention there is further contemplated the method of fishing that comprises the steps of forming a body of material having a perforation therein to allow a fishing line to slide freely therethrough and assembling the body of material to a fishing pole, with the body of material between two eyelets on the pole and having the fishing line extend through the perforation. The body of material is then removably connected to the fishing pole while casting the fishing line to a desired location. The fishing pole is then placed in a desired rest position and the body of material is removed from its connection with the fishing pole so as to hang freely with only the fishing line supporting it. The body of material is then watched for erratic or unusual movement at which time the fishing pole is removed from it place of rest and the reel is operated to bring in the line.

It is an object of the present invention to provide an on line fish indicator that allows easier casting of a fishing line.

It is an object of the present invention to provide a combination fishing pole and on-line fish indicator that allows the fish indicator to be stored on the pole during the casting process.

It is an object of the present invention to provide a new and easy to use fish indicator that can be removably attached to a fishing pole.

It is a further object of the present invention to provide a method of fishing that allows for more efficient casting of a fishing line having an on-line fish indicator on the fishing line.

It is a further object of the present invention to provide a combination on-line fish indicator and fishing pole that allows the fish indicator to be removably connected to the fishing pole.

It is a further object of the present invention to provide an on-line fish indicator having a VELCRO (a hook like type of fabric or material), type fastener connecting to the body of a fishing pole.

It is a further object of the present invention to provide a more convenient bobber for a person fishing off the bottom of a lake or dam.

It is a further object of the present invention to provide an economical way to keep from losing, stepping on or breaking a fishing bobber.

BRIEF DESCRIPTION OF THE DRAWINGS

FIG. 1 is a side view of a fishing pole and bobber according to the present invention.

FIG. 6 is a side view of an insert for a fish line indicator according to the present invention.

FIG. 7 is a sectional top view of still another embodiment of the present invention.

FIG. 8 is a perspective view of a fishing pole and an indicator in a rest position.

DETAILED DESCRIPTION OF THE DRAWINGS

Figure 1A:
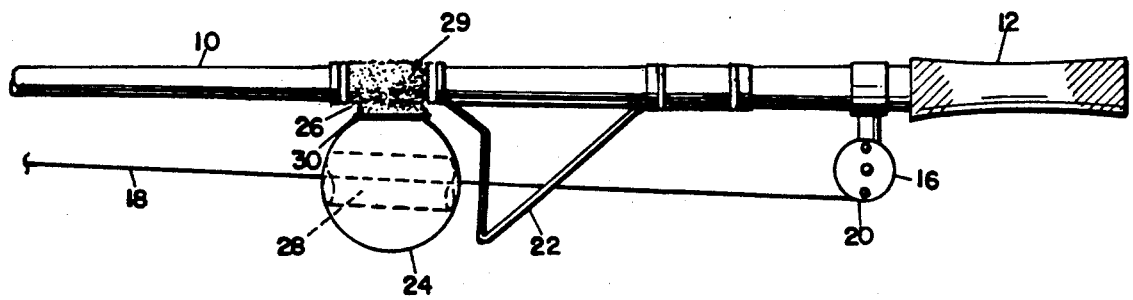
FIG. 1A is an enlarged view of one end of the fishing pole and bobber combination according to the present invention.

What is shown in FIG. 1 is a fishing pole 10 with a handle 12 on one end and a rod portion or end 14 extending outwardly from the handle 12 of the fishing pole 10. The fishing pole 10 has a reel 16 and fishing line 18 mounted thereon, with the fishing line 18 extending through eyelets 22, 19, 21, 23, 25 and 27 so that the hook 35 and the sinkers 37 hang down from the rod portion 14 of the fishing pole 10. As can be seen in the figures a fishing line indicator 39 according to the present invention is conveniently located between eyelets 22 and 19 and is attached to the pole by attachment means 29 fixed on the rod portion 14 of the fishing pole 10.

What is shown in FIG. 1A is a fishing pole 10 having a handle 12 on one end and a pole extension, or rod portion 14 on the other end, extending outwardly from the reel 16. The fishing pole 10 has a fishing line 18 shown at 20 as it unwinds from the reel 16. A fishing line eyelet 22 is shown through which the fishing line 18 extends rearwardly toward the reel 16 and forwardly towards the end of the pole 10 and the end of the fishing line 18 which will have the hook for the fish. Shown attached to the fishing pole 10 is the on-line indicator 24 shown attached to the pole 10 at 26. The fish indicator 24 has a perforation 28 (shown with dotted lines) extending completely through the indicator 24. The perforation 28 has sufficient dimension that the fishing line 18 may slide freely therethrough as it is wound and unwound from the reel 16. The indicator 24 hooked to the pole 10 at 26 shows the co-operating elements of attachment 28 attached to the pole 10 at 30 attached to the indicator 24. These co-operating elements 29 and 30 are preferably of a VELCRO (a hook like type of fabric or material), type material such that a push-on pull-off releasable connection is established that a fisherman may attach and release with his hands.

Figure 2:
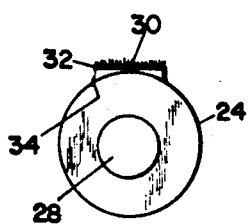
FIG. 2 is a front view of one embodiment of a fish line indicator according to the present invention.

Shown in FIG. 2 is a front side view of one embodiment of a fish indicator 24 showing the perforation 28 which is preferably approximately ⅜ inch in diameter. In this particular case the indicator 24 is made of a solid or hollow sphere of plastic or other material and has a VELCRO (a hook like type of fabric or material), element 30 glued with a glue 32 to a flat portion 34 formed on the spherical element 24.

Figure 2A:
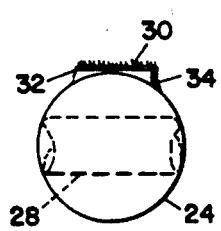
FIG. 2A is a side view of the fish line indicator of FIG. 2.

Shown in FIG. 2A is the perforation 28 (dotted lines) extending from one end of the body 24 to the other and having the VELCRO (a hook like type of fabric or material), 30 again formed on a planar portion 34 and having the glue material 32 holding it thereon.

Figure 2B:
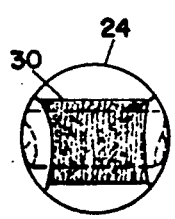
FIG. 2B is a top view of the fish line indicator of FIG. 2.

Shown in FIG. 2B a top view of indicator 24 with the VELCRO (a hook like type of fabric or material), material 30 seen from a top view. The VELCRO (a hook like type of fabric or material), material 30 is generally described as being a hook like type of fabric or material that can co-operate with a similar type of material as is shown at 29 in FIG. 1A, so as to be hand releasable from attachment to the pole 10.

Figure 3:
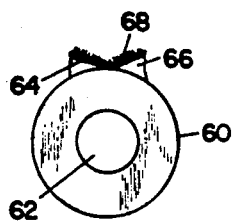
FIG. 3 is a front view of another embodiment of a fish line indicator according to the present invention.

What is shown in FIG. 3 is a side view of another embodiment 60 of a fishing line indicator according to the present invention. The fishing line indicator 60 has a perforation 62 and has planar portions 64 and 66 to which are attached a velcro material 68. The planar portions 64 and 66 form a V shape to configuration when viewed from the side.

Figure 3A:
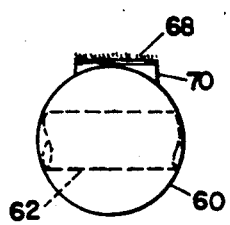
FIG. 3A is a side view of the fish line indicator of FIG. 3.
Figure 3B:
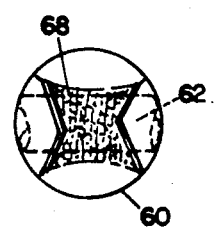
FIG. 3B is a top view of the fish line indicator of FIG. 3.

FIG. 3A is a side view of the fishing line indicator 60 shown in FIG. 3 with the perforation 62 shown extending through 60 and the velcro material shown at 68 mounted to the portion 70 on the bobber 60. Shown in FIG. 3B is a top view of the fishing line indicator 60 showing the perforation 62 with the configuration of the VELCRO (a hook like type of fabric or material), material 68.

Figure 4:
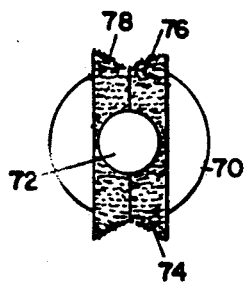
FIG. 4 is a top view of another embodiment of a fish line indicator according to the present invention.

What is shown in FIG. 4 is another embodiment 70 of a fishing line indicator having a perforation 72 but in this case having the VELCRO (a hook like type of fabric or material), material 74 extending completely around or substantially around the circumference of the spherical body 70 and having planner portions 76 and 78 that when viewed from a side view form a V shaped configuration for attachment to the pole attachment means 29.

Figure 5:
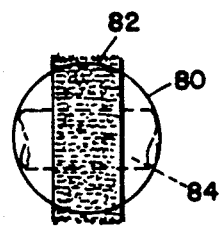
FIG. 5 is a top view of another embodiment of a fish line indicator according to the present invention.

What is shown in FIG. 5 is another embodiment 80 of a fish line indicator having VELCRO (a hook like type of fabric or material), material 82 surrounding this substantially spherically body 80 so that the VELCRO (a hook like type of fabric or material), material 82 may be attached to the pole attachment with means 29. 84 is the perforation shown formed in the fish line indicator 80 in FIG. 5.

Shown in FIG. 6 is an insert perforation 36 which may be formed of a plastic, ceramic, or metallic material and for use with other types of materials such as wood, styrofoam, cork and the like that may be used to form the body of the on-line indicator 24. When this is the case the insert 36 will preferably have an inside diameter 38 of approximately ⅜ inch and will have a lip 40 which will aid in insertion and gluing the insert 36 into a body of a on-line indicator.

Shown in FIG. 7 is an alternate construction 42 of an on-line indicator, in this case the body 42 is formed of two similar parts 44 and 46 which may be glued together at the sites shown by 48 and 50, with the sites 48 and 50 being typical mating sites on the two similar halves. When this is done in such a manner even an insert 36, such as is shown in FIG. 6, may also be used in order to construct an on-line fishing indicator 42 of several pieces such as parts 44 and 46 and even insert 36.

What is shown in FIG. 8 is a fishing pole 10 having a fishing line 18 extending down to a hook 50 (not shown) and having a weight 52 on the line. The reel 16 is shown with fishing eyelets 22 and 19 on the pole. The fish line indicator pole attachment means 29 is located on the pole between the eyelets 22 and 19 with the fishing line indicator 39 shown hanging in its free position while the pole is supported by support means 90. In this manner, if the fish were to grab the hook 50 shown located beneath the surface of the water shown at 92 the fishing line 18 would cause erratic movement of the fish line indicator 39. The present invention has therefore been shown to be well adapted to carry out the object and obtain the ends and advantages mentioned as well as others inherent by the scope of the disclosure. While presently preferred embodiments of the invention have been given for the purpose of disclosure, numerous changes in the details of construction in arrangement of parts will be readily apparent to those skilled in the art and which are encompassed within the spirit of the invention and scope of the impending claims.

I claim:

1. A visible line movement indicator to indicate when a fish is pulling on a fishing line, said indicator comprising;
   a. a body of material having a perforation formed therein, said perforation of sufficient dimension to allow a fishing line to slide freely therethrough;
   b. means on said body for a hand removable connection to a fishing pole, said connection comprising an interengaging hook material for co-operating hand removeable attachment to an interengaging hook material on said fishing pole.

2. The line movement indicator according to claim 1 in which said removable connection further comprises a planar section on said body of material with said hook like material attached to said planar section.

3. The line movement indicator according to claim 1 in which said body of material has a specific gravity of less than one.

4. The line movement indicator according to claim 1 in which said body of material is comprised of a plastic material.

5. The line movement indicator according to claim 1 in which said material for said body is chosen from the group of materials of styrofoam, wood, or cork, and said perforation is comprised of tubular insert means inserted through said chosen material.

6. The line movement indicator according to claim 5 in which said tubular insert means is comprised of one of a plastic, metallic or ceramic material.

7. The line movement indicator according to claim 1 in which said body of material is comprised of at least two mating parts with said mating parts assembled and held together to form said body.

8. A fishing pole and fish-on-line indicator in combination which comprises:
   a. a fishing pole having a reel near one end and at least two fishing eyelets located toward the other end;
   b. an on-line fish indicator comprising a body of material having a perforation of sufficient dimension to allow a fishing line to slide freely therethrough;
   c. co-operating elements of hand removable connection between said fishing pole and said on-line indicator with the element on said pole located between the eyelets and said co-operating elements of hand removeable connection to said pole comprising an interengaging hook material on said pole and on said body of material.

9. The fishing pole and fish-on-line indicator according to claim 8 in which said removable connection further comprises a planar section on said body of material with said hook like material attached to said planar section and said hook like material wrapped around said pole.

10. The fishing pole and fish-on-line indicator according to claim 8 in which said body of material has a specific gravity of less than one.

11. The fishing pole and fish-on-line indicator according to claim 8 in which said body of material is comprised of a plastic material.

12. The fishing pole and fish-on-line indicator according to claim 8 in which said material for said body is chosen from the group of materials of styrofoam, wood, plastic, or cork and said perforation is comprised of tubular insert means inserted through said chosen material.

13. The fishing pole and fish-on-line indicator according to claim 12 in which said tubular insert means is comprised of one of a metallic, plastic or ceramic material.

14. The fishing pole and fish-on-line indicator according to claim 8 in which said body of material is comprised of at least two mating parts with said mating parts assembled and held together to form said body.

15. The method of fishing that comprises the steps of:
   a. forming a body of material having a perforation therein to allow a fishing line to slide freely therethrough;
   b. assembling the body of material to a fishing pole, with the body of material between two eyelets forward of a reel on the pole and having the fishing line extend through the perforation;
   c. removably connecting the body of material to the fishing pole with co-operating elements of attachment of an interengaging hook material;
   d. casting the fishing line to the desired location;
   e. setting the fishing pole in a desired rest position;
   f. removing the body of material from its connection with the fishing pole and letting it hang freely with only the fishing line supporting it;
   g. watching the movement of the body of material.

* * * * *